United States Patent [19]
Flint et al.

[11] Patent Number: 5,608,608
[45] Date of Patent: Mar. 4, 1997

[54] CARTRIDGE-BASED DESIGN FOR PORTABLE AND FIXED COMPUTERS

[75] Inventors: Ephraim B. Flint, Garrison; John P. Karidis, Ossining; Gerard McVicker, Wappingers Falls; William E. Pence, New York, all of N.Y.

[73] Assignee: International Business Machines Corporation, Armonk, N.Y.

[21] Appl. No.: 634,056

[22] Filed: Apr. 17, 1996

Related U.S. Application Data

[63] Continuation of Ser. No. 368,192, Jan. 4, 1995, abandoned.

[51] Int. Cl.$^6$ .................................. G06F 1/16; H05K 7/10
[52] U.S. Cl. ........................ 361/686; 361/683; 364/708.1
[58] Field of Search .................................. 361/684–686, 361/728, 729; 235/487, 488, 492; 439/31, 79, 928.1; 364/708.1

[56] References Cited

U.S. PATENT DOCUMENTS

| | | | |
|---|---|---|---|
| 5,311,397 | 5/1994 | Harshberger et al. | 361/683 |
| 5,373,149 | 12/1994 | Rasmussen | 235/492 |
| 5,436,857 | 7/1995 | Nelson et al. | 364/708.1 |

FOREIGN PATENT DOCUMENTS

| | | |
|---|---|---|
| 0551514 | 7/1993 | European Pat. Off. |
| WO9400970 | 1/1994 | WIPO |

Primary Examiner—Leo P. Picard
Assistant Examiner—Jayprakash N. Gandhi
Attorney, Agent, or Firm—Jay P. Sbrollini

[57] ABSTRACT

A computer system includes a chassis and a cartridge having separate functional components that interface with one another over a common bus. The chassis includes a plurality of user interface modules, which are generally designed and packaged according to a particular application/work mode, each coupled to a first bus. The cartridge, on the other hand, includes components that can be shared among the various applications/work modes. Specifically, the cartridge has a core processor and memory coupled to a second bus, and at least one slot for housing a communication module that is coupled to the second bus. In addition, the cartridge may be designed to be configured by the user to have a first form and a second form. The cartridge of the first form may be utilized for portable computer processing systems such as laptop, notebook and sub-notebook systems. The cartridge of the second form may be designed to be narrow enough to be utilized in smaller portable computer processing systems, such as hand-held systems.

60 Claims, 7 Drawing Sheets

CARTRIDGE-BASED DESIGN FOR PORTABLE AND FIXED COMPUTERS

This application is a continuation of U.S. application Ser. No. 08/368,192, filed Jan. 4, 1995, now abandoned.

CROSS REFERENCE TO RELATED APPLICATIONS

This application is related to U.S. Application Ser. No. 08/368,186, filed concurrently herewith.

BACKGROUND OF THE INVENTION

The invention relates to computer processing systems, and, more particularly, to the packaging of components of computer processing systems.

Computer processing systems on the market today can be segmented generally into two distinct categories: portable and fixed. Portable computer processing systems are designed to be portable between different work sites (i.e. office, home and travel) and may be characterized, for example, as luggable computer systems, laptop computer systems, notebook computer systems, sub-notebook computer systems, tablet computer systems and hand held computer systems, sometimes called Personal Digital Assistants (PDAs). On the other hand, fixed computer processing systems are intended to remain stationary in a single work site and may be characterized, for example, as desktop computer processing systems and tower computer processing systems.

Portable computer processing systems include components functionally equivalent to those of the larger fixed computer processing systems; yet the components of the portable computer processing system are designed and packaged for restricted dimensional and weight. specifications required for portability. Such components often include, for example, a microprocessor, associated memory, a lightweight and compact keyboard and display, and PCMCIA standard devices such as fax-modems, wired local area network adapters, wireless local area network interface modules, digital data exchange adapters and hard disk drives. Yet, because of the dimensional and weight restrictions associated with the components of the portable computer processing system, the associated costs of the portable computer processing system are much greater than the costs of comparable fixed computer processing systems, and these additional costs are reflected in the purchase price of portable computer processing systems.

Moreover, a user may require two or more computer systems in separate applications/work modes. For example, a user may require a fixed desktop computer system for work and a portable laptop computer system for travel and home-use. In this case, the user is required to expend a heavy investment in purchasing the separate computer systems, which may limit the market for both the fixed and portable computer processing systems.

Because of these limiting cost factors, there is a long standing need in the field of computer processing systems to provide efficient and flexible computer processing systems while achieving low costs.

In another aspect, the invention relates to connecting means for connecting various peripheral devices internal to the chassis of a computer processing system, such as a PCMCIA fax-modem, to an associated peripheral device external to the chassis of the computer processing system, such as telephone line linked to a telephone network. Typically, various internal peripheral devices are uniquely connected to their associated external peripheral device. For example, an internal PCMCIA fax-modem may be designed to extend out through a slot in the chassis and include a unique connector at its exposed end to mate with a telephone line. However, such unique connecting means among the various peripheral devices may create problems in portable computer processing systems, wherein a user must first disconnect the peripheral devices to move the computer processing system from, for example, a home environment to a work environment, and then reconnect the peripherals upon return, thereby experiencing undue delay and frustration.

SUMMARY OF THE INVENTION

The above-stated problems and related problems of the prior art are solved with the principles of the present invention, a cartridge-based design for portable and fixed computers. The computer system of the present invention includes a first chassis having a plurality of user interface modules each coupled to a first bus, and a second chassis having a plurality of user interface modules each coupled to a second bus. The user interface modules provide an interface to devices such as a keyboard, a mouse, a display, a speaker, a microphone, a data storage device or various other input/output devices which are generally designed and packaged according to a particular application/work mode (e.g., desk-based, taking home in the evenings, traveling, hand held).

The cartridge, on the other hand, includes components that can be shared among the various applications/work modes. Specifically, the cartridge has a core processor and memory coupled to a third bus, and possibly at least one slot for housing a module that is coupled to the third bus. The module may be, for example, a PCMCIA fax-modem, wired local-area network adapter card, or a data storage device such as PCMCIA hard disk drive. The third bus of the cartridge may be detachably connected to the first bus of the first chassis to form a first functional system, or the third bus of the cartridge may be detachably connected to the second bus of the second chassis to form a second functional system.

By detachably connecting the core processor, memory, and modules of the cartridge to the user interface modules of the separate chassis', the cartridge alone may be transferred from one environment to another. In each environment, the chassis' may be optimized for use in their respective applications/work mode. By sharing components between computer processing systems in separate environments, the cost of the computer processing system in each environment is substantially decreased. Furthermore, the use of multiple user interfaces optimized for different work modes or tasks is allowed.

Moreover, the cartridge may be shared across various platforms. For example, both a fixed computer system and a portable computer processing system could incorporate the cartridge of the present invention. By sharing components between the two platforms, the cost of the desktop computer processing system and a portable computer processing system is substantially decreased.

In addition, the cartridge may be designed to be configured by the user in a first form and a second form. For example, the cartridge may include a first portion connected to a second portion by a hinge. The cartridge of the first form may be utilized for portable computer processing systems such as laptop, notebook and sub-notebook systems. The cartridge of the second form may be designed to be narrow enough to be utilized in smaller portable computer processing systems, such as hand-held systems. By sharing components among the various portable computer processing systems, the costs of such systems is substantially decreased.

In another aspect, the computer system of the present invention includes a chassis having an internal connector with a first portion in electrical contact with a first external peripheral device. A second portion of the internal connector is in electrical contact with a second external peripheral device. An adapter is coupled between an internal device and the internal connector. The internal device is associated with either the first or second external peripheral devices. The adapter has either a first portion that connects the internal device to the first portion of the internal connector or a second portion that connects the internal device to the second portion of the internal connector in order to couple the internal device to its associated external peripheral device.

The benefits of using the adapter in conjunction with the internal connector of the chassis are two-fold. First, the user is not required to match the internal device to its associated external peripheral device because the connection between the two is automatic. And second, the internal device may be disconnected from the chassis without disturbing the associated external peripheral device, thus providing a user-friendly system.

DETAILED DESCRIPTION OF THE PREFERRED EMBODIMENTS

Figure 1:
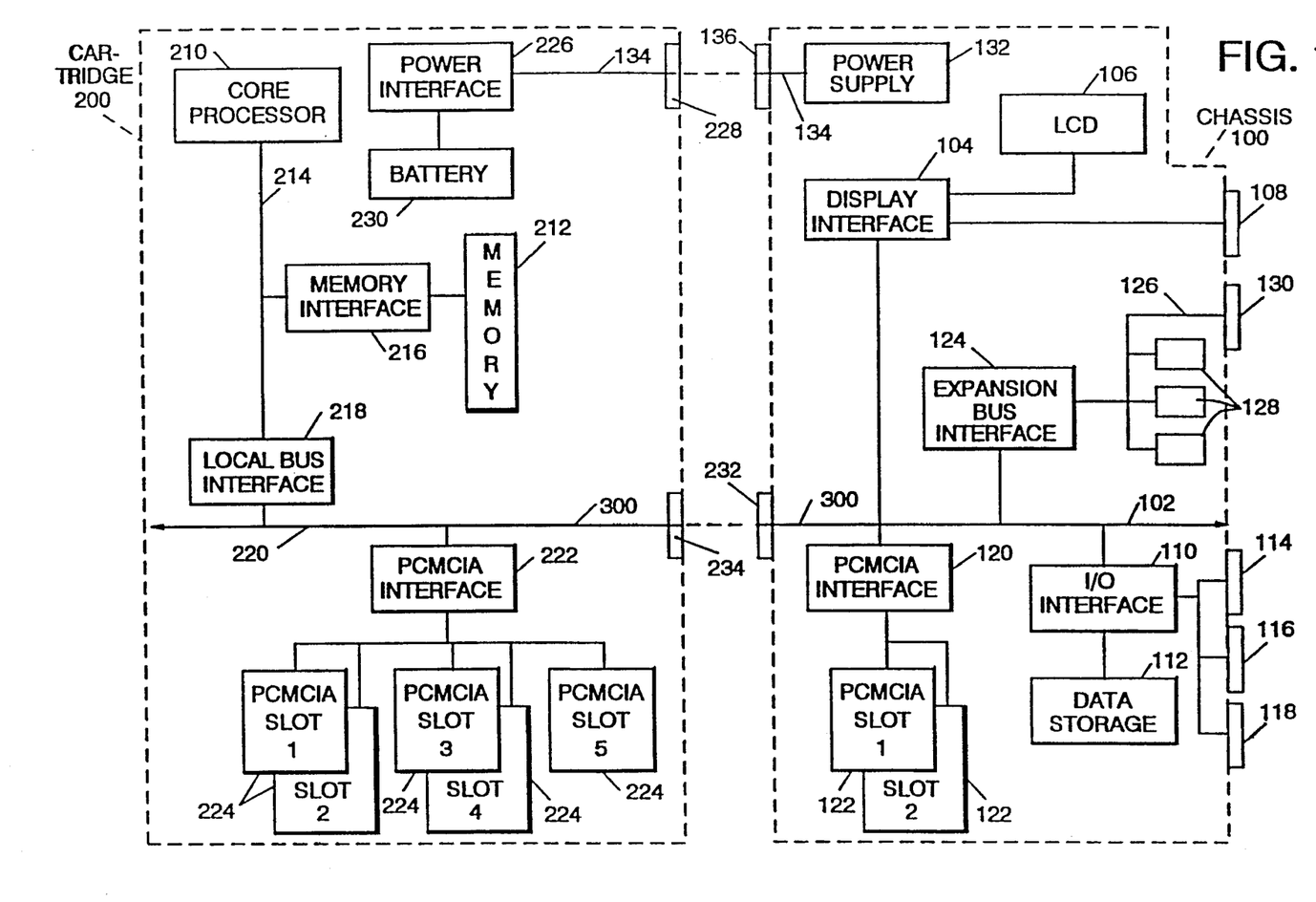
FIG. 1 is a functional block diagram of a computer processing system in accordance with the present invention.

FIG. 1 illustrates a computer processing system in accordance with the present invention. The computer processing system includes a chassis 100 detachably connected to a cartridge 200. The chassis 100 includes a plurality of user interface modules that provide an interface to devices such as a keyboard, a mouse, a display, a speaker, a microphone, a data storage device or various other input/output devices which are generally designed and packaged according to a particular application/work mode (e.g., desk-based, taking home in the evenings, traveling, hand held). The cartridge 200, on the other hand, includes components having computer functions (e.g. processing, memory, data storage) and communications functions that can be shared among the various applications/work modes. The cartridge 200 and the chassis 100 interface with one another over a common bus 300, for example, a PCI standard bus. The common bus 300 may include one or more parallel buses and/or one or more serial buses, such as an ACCESS bus, an INTEL serial bus, or an IEEE P.1394 serial bus. By detachably connecting the computer functions of the cartridge 200 to the user interface modules of the chassis 100, the cartridge 200 may be transferred from one environment to another. In each environment, the cartridge 200 may be connected to separate chassis' 100 which are optimized for use in their respective applications/work mode. By sharing components between computer processing systems in separate environments, the cost of the computer processing system in each environment is substantially decreased. Furthermore, the use of multiple user interfaces optimized for different work modes or tasks is allowed.

Specifically, the chassis 100 includes a plurality of user interface modules coupled to a first bus 102, which corresponds to the common bus 300. The user interface modules may include a display interface 104 for driving an LCD display 106 integrated into the chassis 100 or an external display connected to the chassis 100 via connector 108. The display interface typically includes a graphics controller and associated memory. The user interface modules may also include an I/O interface 110 that provides an interface to I/O devices such as a data storage device 112, an external keyboard or pointing device (i.e. mouse) via connector 114, and external peripheral devices via a serial port 116 and a parallel port 118. The data storage device 112 may be, for example, a magnetic hard disk drive, a tape back-up drive, a CD-ROM drive or an optical drive. The external peripheral devices connected to the serial port 116 and/or parallel port 118 may include a printer, a communication device such as a modem, a pointing device such as a mouse, and a data processing device that processes I/O data. The data processing device may be, for example, a video interface adapter for processing video information or an analog to digital processing device for processing analog signals input to and/or output from the system, such as voice signals input to the system from a microphone and output from the system by a speaker.

The user interface modules may also include a PCMCIA interface 120 for driving at least one PCMCIA device inserted into PCMCIA slots 122. The chassis 100 of FIG. 1 includes two PCMCIA slots 122 for example only; thus, the chassis 100 may include one or a plurality of PCMCIA slots 122 depending upon the design. The PCMCIA device inserted into the PCMCIA slots 122 may be a wired local-area network adapter, a wireless local area network interface module or a digital data exchange adapter which are used primarily in the specific location of the chassis 100. The PCMCIA device may also perform any of the functions described above with respect to the I/O interface 110. The utilization of the PCMCIA standard bus structure and PCMCIA dimensional configurations with regard to interface 120, slots 122 and the respective devices inserted into the slots 122 is for convenience purposes only, and it is well understood by those of skill in the art that a similar standard may be substituted for the PCMCIA standard.

Furthermore, the chassis 100 may include an expansion bus interface 124 that bridges the first bus 102 to an expansion bus 126, which may be, for example, an AT standard bus. The expansion bus interface 124 converts data transmitted over the first bus 102 to the expansion bus 126, and converts data transmitted over the expansion bus 126 to the first bus 102. The chassis 100 may also include expansion slots 128 and an expansion bus connector 130 coupled to the expansion bus 126 to provide an interface to additional peripheral devices such as a network interface card, a CD-ROM, and other forms of communication and storage devices. The chassis 100 of FIG. 1 includes three expansion slots 128 for example only; thus, the chassis 100 may include one or a plurality of expansion slots 128 depending upon the design.

Moreover, the chassis 100 may include a power supply 132 that provides power to each of the user interface modules and to the cartridge 200 via power bus 134 and connector 136. The power supply 132 may include a voltage conversion circuit that converts AC line power to the appropriate DC voltage levels required by the modules. The power supply 132 may also include a battery that supplies the appropriate DC voltage levels to the modules when the voltage conversion circuit is inactive. The power bus 134 and common bus 300 may share a single connector pair, for example, connectors 232, 234 and/or the power bus 134 may be part of the common bus 300.

The cartridge 200 of FIG. 1 includes components having computer functions that can be shared among the various applications/work modes. Specifically, the cartridge 200 includes a core processor 210 coupled to memory 212 via a high-speed processor bus 214 and memory interface 216. The memory 212 may be system dynamic memory, cache memory, and/or non-volatile memory. The memory interface 216 performs functions such as address decoding and bus control such that the core processor 210 can read data from and write data to the memory 212. The memory interface 216 may also perform functions such as dynamic memory refresh. A processor bus interface 218 bridges the processor bus 214 to a second bus 220, which corresponds to the common bus 300. The processor bus interface 218 converts data transmitted over the processor bus 214 to the second bus 220 and converts data transmitted over the second bus 220 to the processor bus 214.

The cartridge 200 may also include components having functions that can be shared among the various applications/work modes. Specifically, the cartridge 200 may include a PCMCIA interface 222 coupled to the second bus 220 for driving at least one PCMCIA device inserted into PCMCIA slots 224. The cartridge 200 of FIG. 1 includes five PCMCIA slots 224 for example only; thus, the cartridge 200 may include one or a plurality of PCMCIA slots 224 depending upon the design. The PCMCIA device may be a communication device, such a wired local-area network adapter, a wireless local area network interface module, a digital data exchange adapter, a data storage device such a hard disk, or a data processing device that processes I/O data. The data processing device may be, for example, a video interface adapter for processing video information or an analog to digital processing device for processing analog signals input to and/or output from the system, such as voice signals input to the system from a microphone and output from the system by a speaker. The PCMCIA slots 224 may be of different configurations (i.e., Type II and Type III). To provide the user with flexibility in choosing the location of specific PCMCIA devices, preferably each of the PCMCIA slots 224 have Type II configurations. Again, the utilization of the PCMCIA standard bus structure and PCMCIA dimensional configurations with regard to interface 222, slots 224 and the respective devices inserted into the slots 224 is for convenience purposes only, and it is well understood by those of skill in the art that a similar standard may be substituted for the PCMCIA standard.

The cartridge 200 may also include a power interface 132 that provides the appropriate DC voltage levels to each of the components of the cartridge 200. The power interface 226 may be coupled to the power bus 134 of the chassis 100 by mating connector 228 to connector 136. The power interface 226 may also include a battery 230 that supplies the appropriate DC voltage levels to the components of the cartridge 200 when the cartridge 200 is separated from the chassis 100. It is contemplated that the battery 230 may be packaged in a PCMCIA device configuration and housed in a dedicated PCMCIA slot 224, thus expending one of the PCMCIA slots 224.

The components of the cartridge 200 interface with the modules of the chassis 100 over the common bus 300. The common bus 300 is constructed by mating connector 232 of the chassis 100 with connector 234 of the cartridge 200, which connects the first bus 102 of the chassis 100 to the second bus 220 of the cartridge 200. By detachably connecting the computer functions of the cartridge 200 to the user interface modules of the chassis 100, the cartridge 200 may be transferred from one environment to another. In each environment, the cartridge 200 may be connected to separate chassis' 100 which are optimized for use in their respective applications/work mode. Moreover, by sharing components between computer processing systems in separate environments, the cost of the computer processing system in each environment is substantially decreased.

Figure 2:
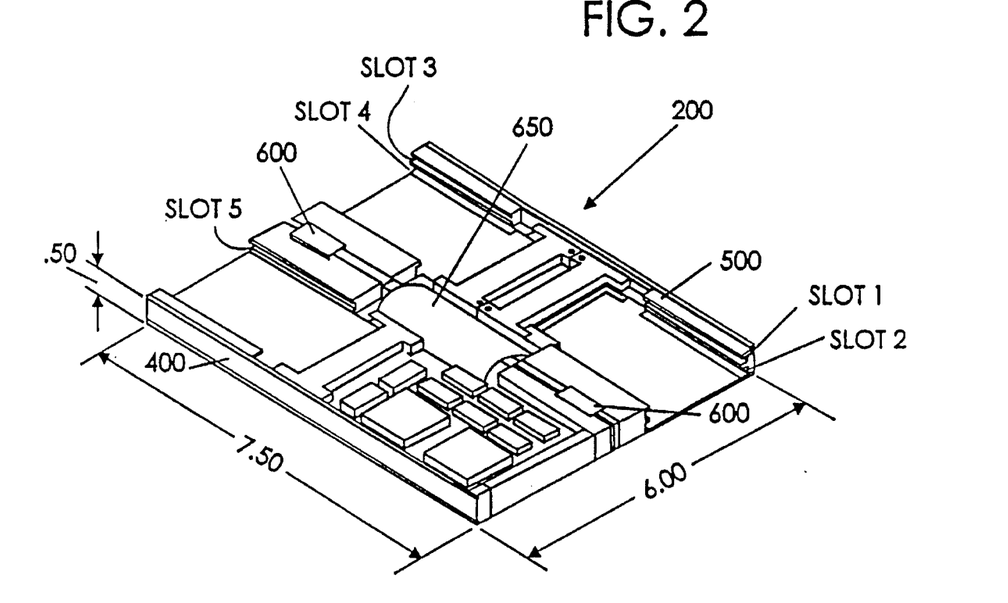
FIG. 2 is an isometric view of the cartridge of FIG. 1 configured in a first form.
Figure 3:
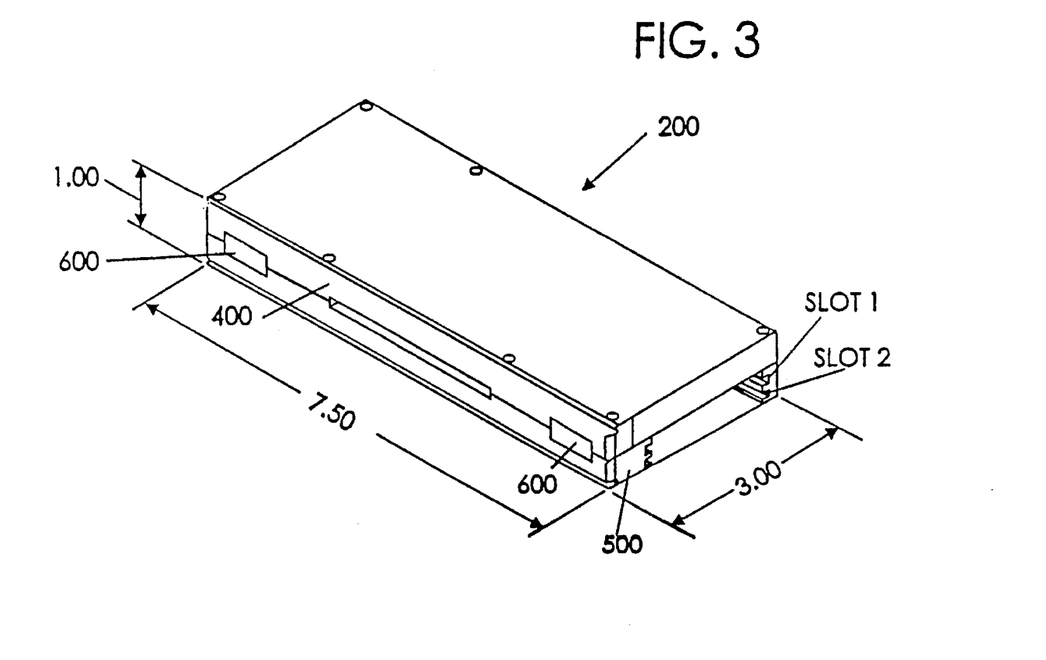
FIG. 3 is an isometric view of the cartridge of FIG. 1 configured in a second form.

The cartridge 200 of FIG. 1 may be designed such that the cartridge 200 can be configured by the user to have a first form and a second form. As shown in FIGS. 2 and 3, the cartridge 200 may include a first portion 400 connected to a second portion 500 by hinges 600 or other suitable connection devices. In this case, the electrical connections between the first portion and the second portion may be provided by a flexible cable 650. The two portions need not have identical dimensions as shown in FIG. 2.

FIG. 2 illustrates the first form of the cartridge 200 having, for example, a characteristic length, width and height of 7.5 inches, 6.0 inches and 0.5 inches, respectively, which is suitable for use in desktop, laptop, notebook and sub-notebook or other large pen or keyboard based computer processing systems. On the other hand, FIG. 3 illustrates the second form of the cartridge 200 having, for example, a characteristic length, width and height of 7.5 inches, 3.0 inches, 1.0 inches, respectively, which is suitable for a hand held device. As shown in FIG. 3, the second form has a thickness that is twice the thickness of the first form and a width that is half the width of the first form and narrow enough to be readily grasped with one hand. Because the cartridge 200 can take two forms: a first form that is wide yet thin and a second form that is narrower but thicker than the first from, the cartridge 200 can be more easily integrated both into larger computer processing systems which for ergonomic reasons have a constrained thickness and into hand-held systems which have a constrained width.

The cartridge 200 of FIG. 2 may also be configured to have a first form having, for example, a characteristic length, width and height of 7.5 inches, 6.0 inches and 0.5 inches, respectively, and a second form having, for example, a characteristic length, width and height of 3.75 inches, 6.0 inches, 1.0 inches, respectively. In this case, the second form has a thickness that is twice the thickness of the first form and a length that is half the length of the first form and narrow enough to be readily grasped with one hand.

Figure 4:
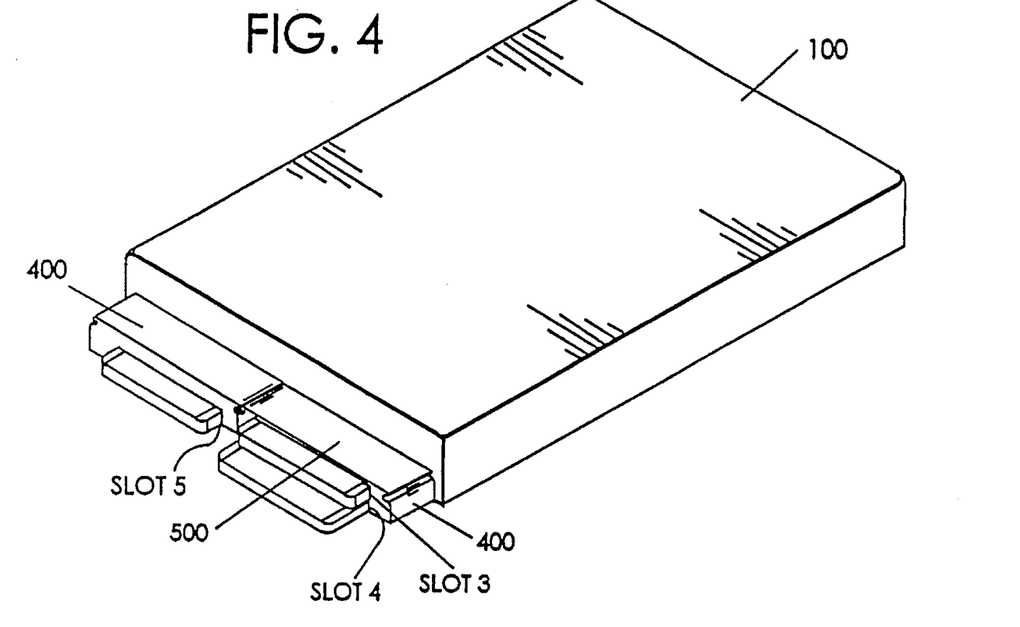
FIG. 4 is an isometric top view of the cartridge of FIG. 2 with PCMCIA cards inserted into slots 3, 4 and 5 plugged into a tablet style user interface chassis.

FIG. 4 shows the cartridge 200 of the first form as depicted in FIG. 2 with PCMCIA cards inserted into slots 3, 4 and 5 plugged into a tablet style user interface chassis.

Figure 5:
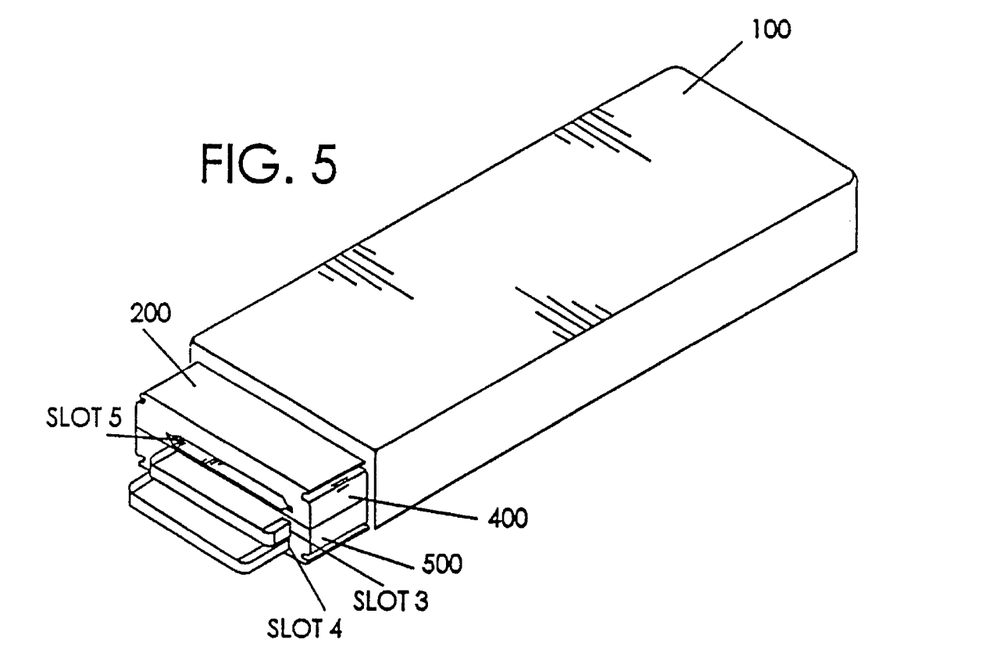
FIG. 5 is an isometric top view of the cartridge of FIG. 3 with PCMCIA cards inserted into slots 3 and 4 plugged into a hand held PDA style user interface chassis.

FIG. 5 shows the cartridge 200 of the second form as depicted in FIG. 3 with PCMCIA cards inserted into slots 3 and 4 plugged into a hand held PDA style user interface chassis.

Figure 6:
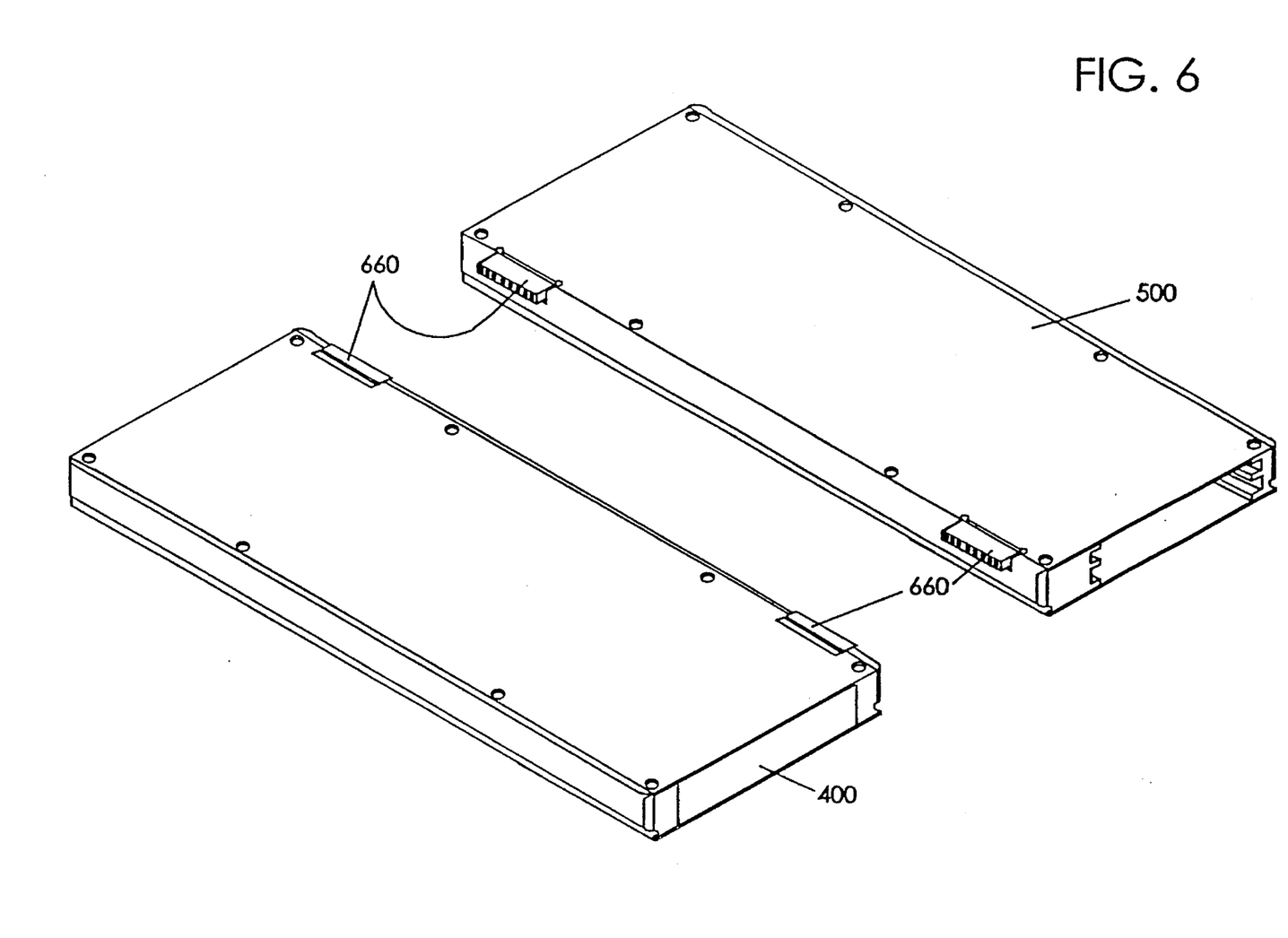
FIG. 6 is an exploded isometric view of the cartridge of FIG. 1 configured in a first form.
Figure 7:
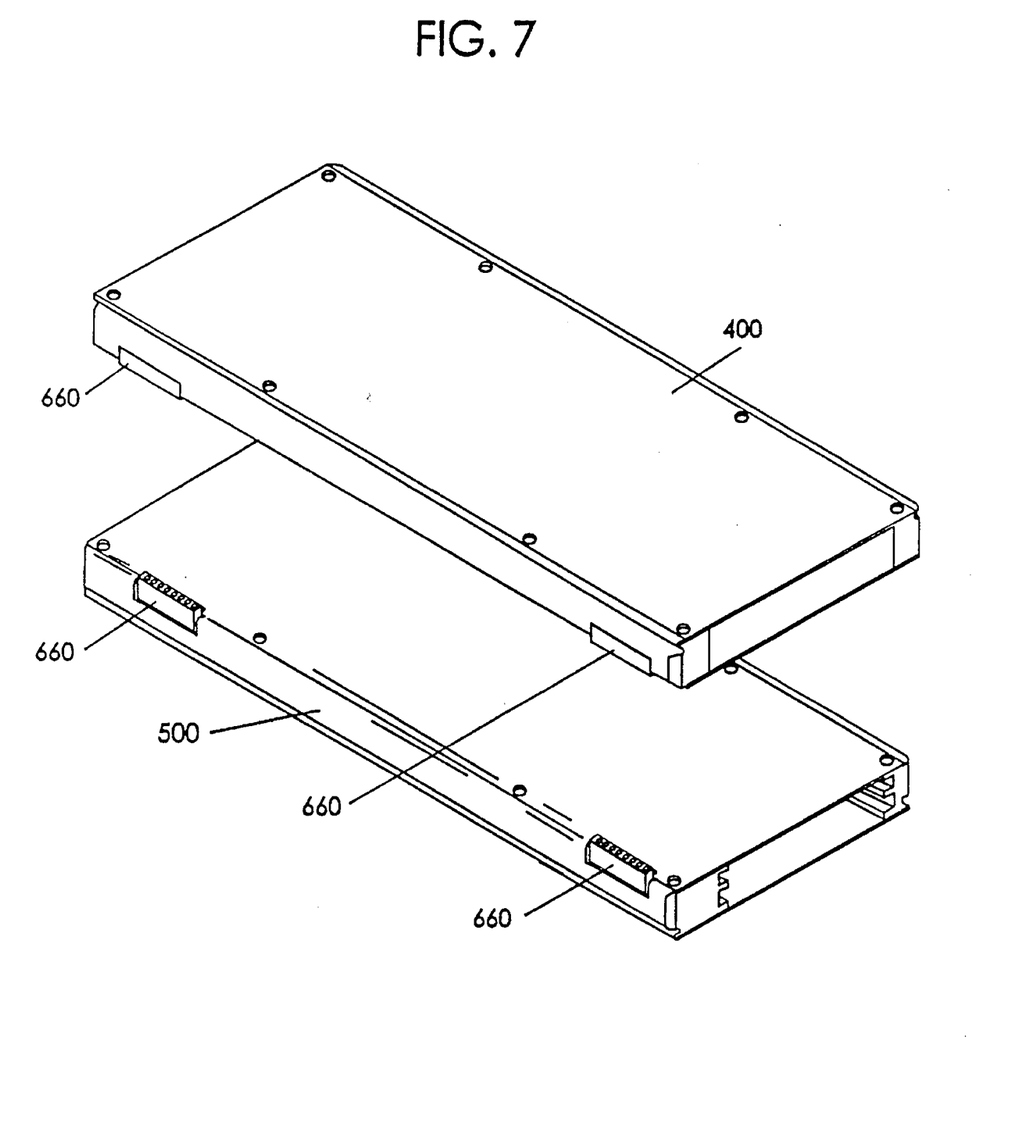
FIG. 7 is an exploded isometric view of the cartridge of FIG. 1 configured in a second form.

FIGS. 6 and 7 illustrate the cartridge 200 that utilizes at least one pair of hinged connectors 660 (for example, two pairs are shown), instead of hinges and flexible cable, to join the first portion 400 to the second portion 500. FIG. 6 illustrates the first form of the cartridge 200, which is wide and slim and thus suitable for use in desktop, laptop, notebook, sub-note book or other large pen or keyboard based computer processing systems. FIG. 7 illustrates the second form of the cartridge 200, which is narrow and thick and thus suitable for a hand held device.

Moreover, the first portion 400 may include components having computer functions (i.e., core processor 210, memory 212, memory interface 216, and local bus interface 218), and the second portion 500 may include PCMCIA components (i.e., PCMCIA interface 222 and associated devices). Using the hinged connector pairs 660 allows the first portion 400 to be disconnected from the second portion 500. In this case, the first form of the cartridge 200 may include, for example, the first and second portions 400, 500 connected as shown in FIG. 6, which is suitable for use in desktop, laptop, notebook, sub-note book or other large pen or keyboard based computer processing systems. On the other hand, the second form of the cartridge 200 may include only the first portion 400, which may be suitable for a hand held device.

Figure 8:
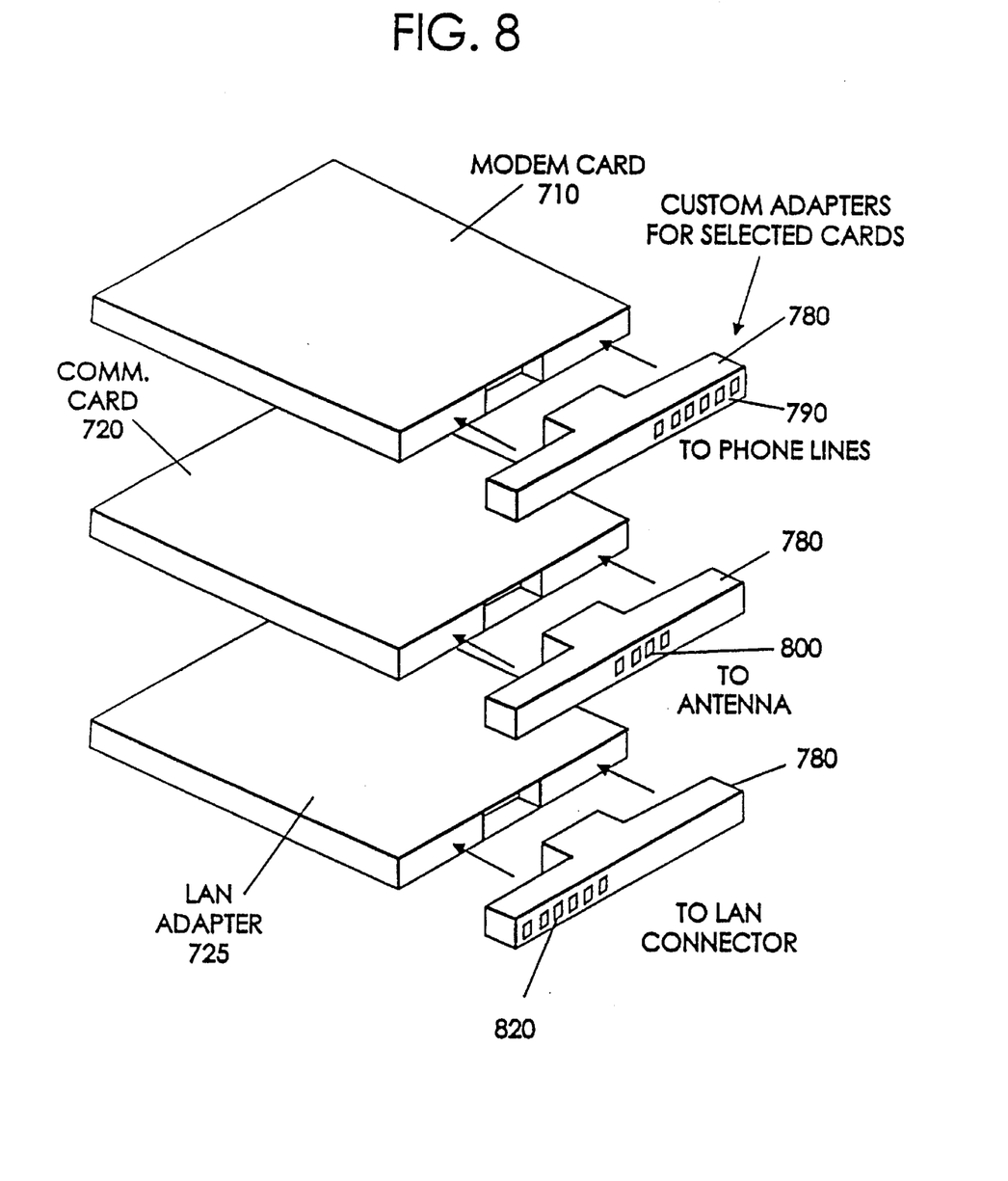
FIG. 8 illustrates adapters for connecting various PCMCIA cards to their respective peripheral devices in accordance with the present invention.
Figure 9A:
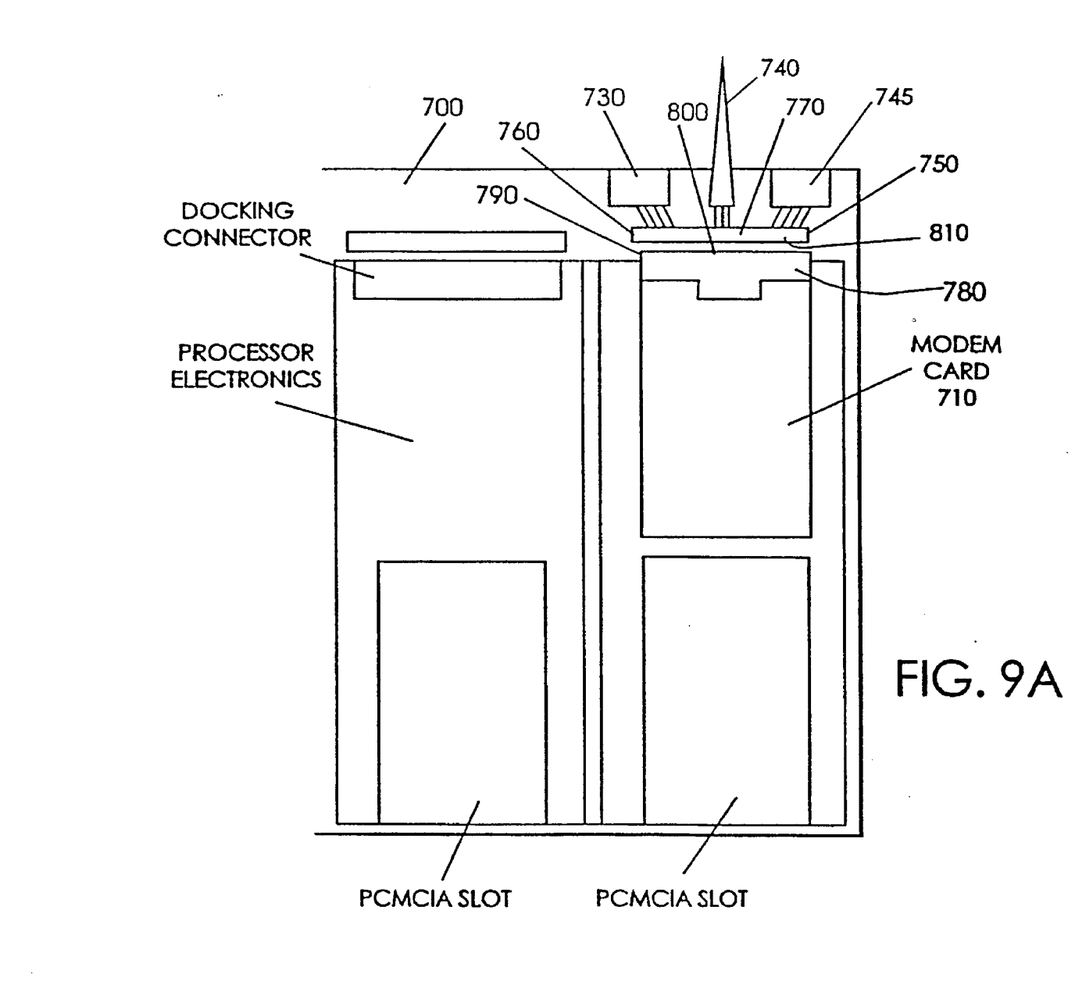
FIG. 9(a) is a functional block diagram of the adapters of FIG. 8 used in conjunction with a chassis to connect PCMCIA cards to their respective peripheral devices.
Figure 9B:
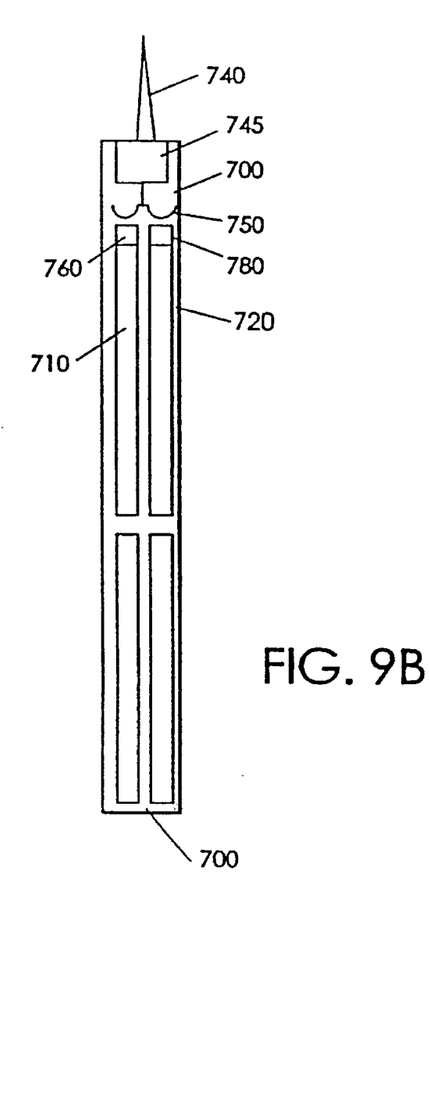
FIG. 9(b) is a cross-sectional side elevational view of FIG. 9(a).

In another aspect, the computer system of the present invention as shown in FIGS. 8, 9(a) and 9(b) may include a chassis 700 that provides a cableless connection between at least two internal devices housed within the chassis 700 and external connectors of the chassis 700 that connect to external peripheral devices associated with each of the internal devices. For example, as depicted in FIGS. 8, 9(a) and 9(b), the internal devices may be a PCMCIA modem card 710, a PCMCIA wireless communication card 720 and a PCMCIA wired local area network adapter card 725. The external peripheral devices associated with each of the internal devices may be a phone line adapter 730, an antenna 740 and a local-area network connector 745, respectively. Normally, the internal devices are connected directly or indirectly via cables to their associated external peripheral devices. These cables are often annoying because they must be disconnected whenever the internal device is removed from the chassis, they must be associated with the correct internal device and external peripheral device, and they often exit the front or side of the chassis 700 in an inconvenient and unattractive manner. The computer system of the present invention eliminates the need for such annoying cables.

Specifically, the chassis 700 includes an internal connector 750 that connects to at least two internal devices. As shown in FIGS. 8, 9(a) and 9(b), the internal devices may be a PCMCIA modem card 710, a wireless PCMCIA communication card 720 or a wired PCMCIA local-area adapter card 725. The internal devices are separately associated with external peripheral devices. For example, as shown in FIGS. 8, 9(a) and 9(b), the PCMCIA modem card 710 is associated with the phone line adapter 730, the wireless PCMCIA communication card 720 is associated with the antenna 740, and the wired PCMCIA local-area network adapter card is associated with the local-area network connector 745. A first portion 760 of the internal connector 750 is in electrical contact with a first external peripheral device, for example, the phone line adapter 730. A second portion 770 of the internal connector is in electrical contact with a second external peripheral device, for example, the antenna 740. A unique adapter 780 is coupled between each internal device and the internal connector 750. The adapter 780 has either a first portion 790 that connects the internal device to the first portion 760 of the internal connector 750 or a second portion 800 that connects the internal device to the second portion 770 of the internal connector 750 in order to couple the internal device to its associated external peripheral device.

As described above, the adapters 780 and the internal connector 750 provide a cableless connection between two internal devices and their associated external peripheral devices. However, the present invention is not limited in this respect and may be used connection three or more internal devices and their associated external peripheral devices. For example, as shown in FIGS. 8 and 9(a), the internal connector 750 may include a third portion 810 in electrical contact with a third external peripheral device, for example, the local area network adapter 745. The adapter 780 then has either a first portion 790 that connects the internal device to the first portion 760 of the internal connector 750 or a second portion 800 that connects the internal device to the second portion 770 of the internal connector 750 or a third portion 820 that connects the internal device to the third portion 810 of the internal connector 750 such that the internal device is coupled to its associated external peripheral device.

The benefits of using the adapters 780 in conjunction with the internal connector 750 of the chassis 700 are twofold. First, as long as the appropriate adapter 780 is affixed to the respective internal device, the user is not required to match the internal device to its associated external peripheral device because the connection between the two is automatic. And second, the internal device may be disconnected from the chassis 700 without disturbing the associated external peripheral device, thus providing a user-friendly system. Typically, the adapters 780 remain affixed to their respective internal device ready for insertion into another chassis 700.

Although the invention has been shown and described with respect to the particular embodiments thereof, it should be understood by those skilled in the art that the foregoing and various other changes, omissions, and additions in the form and detail thereof may be made without departing from the spirit and scope of the invention.

We claim:

1. A computer system comprising:

a first chassis having at least one user interface module coupled to a first bus;

a second chassis, different than said first chassis, having at least one user interface module coupled to a second bus; and a cartridge having a core processor and memory coupled to a third bus;

wherein said third bus of said cartridge is detachably connected to said first bus of said first chassis to form a first functional system, or said third bus of said cartridge is detachably connected to said second bus of said second chassis to form a second functional system;

wherein said first, second, and third buses each comprise a plurality of buses; and wherein said plurality of buses of said first bus connects to said plurality of buses of said third bus through separate first connectors, and said plurality of buses of said second bus connects to said plurality of buses of said third bus through separate second connectors.

2. A computer system comprising:

a first chassis having at least one user interface module coupled to a first bus;

a second chassis, different than said first chassis, having at least one user interface module coupled to a second bus; and a cartridge having a core processor and memory coupled to a third bus;

wherein said third bus of said cartridge is detachably connected to said first bus of said first chassis to form a first functional system, or said third bus of said cartridge is detachably connected to said second bus of said second chassis to form a second functional system;

wherein said cartridge can be configured by a user of said computer system to have a first form and a second form; and wherein said cartridge comprises a first portion connected to a second portion by at least one hinged connector.

3. A computer system comprising:

a first chassis having at least one user interface module coupled to a first bus;

a second chassis, different than said first chassis, having at least one user interface module coupled to a second bus; and a cartridge having a core processor and memory coupled to a third bus;

wherein said third bus of said cartridge is detachably connected to said first bus of said first chassis to form a first functional system, or said third bus of said cartridge is detachably connected to said second bus of said second chassis to form a second functional system;

wherein said cartridge can be configured by a user of said computer system to have a first form and a second form; and wherein said cartridge of said first form comprises a first portion connected to a second portion by a first connector, and said cartridge of said second form comprises said first portion connected to said second portion by a second connector different than said first connector.

4. A computer system comprising:

a first chassis having at least one user interface module coupled to a first bus;

a second chassis, different than said first chassis, having at least one user interface module coupled to a second bus; and a cartridge having a core processor and memory coupled to a third bus;

wherein said third bus of said cartridge is detachably connected to said first bus of said first chassis to form a first functional system, or said third bus of said cartridge is detachably connected to said second bus of said second chassis to form a second functional system; and wherein said cartridge comprises at least one slot for housing a module that is coupled to said second bus.

5. The computer system of claim 4, wherein said module is an wireless communication module.

6. The computer system of claim 4, wherein said module is a modem.

7. The computer system of claim 4, wherein said module is a wired local area network adapter.

8. The computer system of claim 4, wherein said module is a digital communication module.

9. The computer system of claim 4, wherein said module is an analog communication module.

10. The computer system of claim 4, wherein said module is a data storage device.

11. The computer system of claim 10, wherein said data storage device is a hard disk drive.

12. The computer system of claim 4, wherein said module is a data processing device.

13. The computer system of claim 12, wherein said data processing device is a video interface adapter.

14. The computer system of claim 12, wherein said data processing device processes analog signals input to and/or output from the computer system.

15. The computer system of claim 14, wherein said analog signals are voice signals.

16. The computer system of claim 4, wherein said slot is a PCMCIA standard slot.

17. The computer system of claim 4, wherein one of said first chassis and said second chassis has an internal connector having a first portion in electrical contact with a first external peripheral device, a second portion in electrical contact with said second external peripheral device and a third portion in electrical contact with a third external peripheral device, said module being associated with one of said first, second and third external peripheral devices; and said computer system further comprises an adapter for coupling said module to said internal connector, said adapter having one of a first portion that connects to said first portion of said internal connector, a second portion that connects to said second portion of said internal connector, and a third portion that connects to said third portion of said third portion of said internal connector.

18. The computer system of claim 4, wherein one of said first chassis and said second chassis has an internal connector having a first portion in electrical contact with a first external peripheral device and a second portion in electrical contact with a second external peripheral device, said module being associated with one of said first external peripheral device and said second external peripheral device; and said computer system further comprises an adapter for coupling said module to said internal connector, said adapter having one of a first portion that connects to said first portion of said internal connector and a second portion that connects to said second portion of said internal connector.

19. The computer system of claim 18, wherein said module is a PCMCIA device.

20. The computer system of claim 18, wherein said module is a modem and said one of said first and second external peripheral devices is a telephone line.

21. The computer system of claim 18, wherein said module is a wired local area network adapter and said one of said first and second external peripheral devices is a wired local-area network communication link.

22. The computer system of claim 18, wherein said module is a wireless communication module and said one of said first and second peripheral devices comprises an antenna.

23. The computer system of claim 18, wherein said module is a data communication module and said one of said first and second peripheral devices is a data communication link.

24. The computer system of claim 18, wherein said module is a video interface adapter and said one of said first and second peripheral devices is video link.

25. A computer system comprising:
- a first chassis having at least one user interface module coupled to a first bus, wherein said first chassis is optimized for use in a first mode;
- a second chassis having at least one user interface module coupled to a second bus, wherein said second chassis is optimized for use in a second mode different from said first mode; and
- a cartridge having a core processor and memory coupled to a third bus;
- wherein said third bus of said cartridge is detachably connected to said first bus of said first chassis to form a first functional system, or said third bus of said cartridge is detachably connected to said second bus of said second chassis to form a second functional system; and
- wherein said cartridge can be configured by a user of said computer system to have a first form and a second form.

26. The computer system of claim 25, wherein said first mode is a stationary mode and said second mode is a portable mode.

27. The computer system of claim 25, wherein said cartridge comprises a first portion connected to a second portion by at least one hinge and a cable.

28. The computer system of claim 25, wherein said cartridge comprises a first portion connected to a second portion by at least one hinged connector.

29. The computer system of claim 25, wherein said cartridge of said first form comprises a first portion connected to a second portion by a first connector, and said cartridge of said second form comprises said first portion connected to said second portion by a second connector different than said first connector.

30. The computer system of claim 25, wherein said first form has a predetermined width, length, and thickness, and said second form has a width approximately half the width of said first form and a thickness approximately twice the thickness of said first form.

31. The computer system of claim 30, wherein said width of said second form is narrow enough to be readily grasped with one hand.

32. The computer system of claim 25, wherein said first form has a predetermined width, length, and thickness, and said second form has a length approximately half the length of said first form and a thickness approximately twice the thickness of said first form.

33. The computer system of claim 32, wherein said length of said second form is short enough to be readily grasped with one hand.

34. The computer system of claim 25, wherein said cartridge comprises at least one slot for housing a module that is coupled to said second bus.

35. The computer system of claim 34, wherein said module is an wireless communication module.

36. The computer system of claim 34, wherein said module is a modem.

37. The computer system of claim 34, wherein said module is a wired local area network adapter.

38. The computer system of claim 34, wherein said module is a digital communication module.

39. The computer system of claim 34, wherein said module is an analog communication module.

40. The computer system of claim 34, wherein said module is a data storage device.

41. The computer system of claim 40, wherein said data storage device is a hard disk drive.

42. The computer system of claim 34, wherein said module is a data processing device.

43. The computer system of claim 42, wherein said data processing device is a video interface adapter.

44. The computer system of claim 42, wherein said data processing device processes analog signals input to and/or output from the computer system.

45. The computer system of claim 44, wherein said analog signals are voice signals.

46. The computer system of claim 34, wherein said slot is a PCMCIA standard slot.

47. A computer system comprising:
- a first chassis having at least one user interface module coupled to a first bus, wherein said first chassis is optimized for use in a first mode;
- a second chassis having at least one user interface module coupled to a second bus, wherein said second chassis is optimized for use in a second mode different from said first mode; and
- a cartridge having a core processor and memory coupled to a third bus;
- wherein said third bus of said cartridge is detachably connected to said first bus of said first chassis to form a first functional system, or said third bus of said cartridge is detachably connected to said second bus of said second chassis to form a second functional system; and
- wherein said cartridge comprises at least one slot for housing a module that is coupled to said second bus.

48. The computer system of claim 47, wherein said first mode is a stationary mode and said second mode is a portable mode.

49. The computer system of claim 47, wherein said module is an wireless communication module.

50. The computer system of claim 47, wherein said module is a modem.

51. The computer system of claim 47, wherein said module is a wired local area network adapter.

52. The computer system of claim 47, wherein said module is a digital communication module.

53. The computer system of claim 47, wherein said module is an analog communication module.

54. The computer system of claim 47, wherein said module is a data storage device.

55. The computer system of claim 54, wherein said data storage device is a hard disk drive.

56. The computer system of claim 47, wherein said module is a data processing device.

57. The computer system of claim 56, wherein said data processing device is a video interface adapter.

58. The computer system of claim 56, wherein said data processing device processes analog signals input to and/or output from the computer system.

59. The computer system of claim 58, wherein said analog signals are voice signals.

60. The computer system of claim 47, wherein said slot is a PCMCIA standard slot.

\* \* \* \* \*